(12) United States Patent
Elgimiabi et al.

(10) Patent No.: US 9,765,215 B2
(45) Date of Patent: Sep. 19, 2017

(54) EPOXY RESIN-BASED COMPOSITION AS A FILLER HONEYCOMB CELLS

(71) Applicant: 3M INNOVATIVE PROPERTIES COMPANY, St. Paul, MN (US)

(72) Inventors: Sohaib Elgimiabi, Neuss (DE); Frank Neuroth, Neuss (DE)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 14/900,909

(22) PCT Filed: Jun. 26, 2014

(86) PCT No.: PCT/US2014/044307
§ 371 (c)(1),
(2) Date: Dec. 22, 2015

(87) PCT Pub. No.: WO2014/210292
PCT Pub. Date: Dec. 31, 2014

(65) Prior Publication Data
US 2016/0160039 A1    Jun. 9, 2016

(30) Foreign Application Priority Data

Jun. 28, 2013    (EP) .................................... 13174347

(51) Int. Cl.
| | |
|---|---|
| *C08L 63/00* | (2006.01) |
| *B32B 3/12* | (2006.01) |
| *C08G 59/38* | (2006.01) |
| *C08G 59/42* | (2006.01) |
| *B29C 70/66* | (2006.01) |
| *B29C 44/18* | (2006.01) |
| *C08G 59/50* | (2006.01) |
| *C08K 7/24* | (2006.01) |

(52) U.S. Cl.
CPC ............ *C08L 63/00* (2013.01); *B29C 44/186* (2013.01); *B29C 70/66* (2013.01); *B32B 3/12* (2013.01); *C08G 59/38* (2013.01); *C08G 59/42* (2013.01); *C08G 59/4238* (2013.01); *C08G 59/5086* (2013.01); *C08K 7/24* (2013.01); *B32B 2260/046* (2013.01); *B32B 2419/04* (2013.01); *B32B 2605/003* (2013.01); *B32B 2605/18* (2013.01); *Y02T 50/433* (2013.01)

(58) Field of Classification Search
CPC ............ C08G 59/42; C08L 63/00; C08K 7/24
See application file for complete search history.

(56) References Cited

U.S. PATENT DOCUMENTS 3,351,574 A     11/1967   Hicks
2011/0313081 A1* 12/2011  Schroetz ................ C08G 59/04
                                                 523/427

FOREIGN PATENT DOCUMENTS

| EP | 0810249 | 12/1997 |
|---|---|---|
| EP | 1838776 | 10/2007 |
| EP | 2653486 | 10/2013 |
| JP | H04-353553 | 12/1992 |
| KR | 2009-0072655 | 7/2009 |
| WO | WO 2008-147658 | 12/2008 |
| WO | WO 00-24559 | 5/2009 |
| WO | WO 2010/101745 | 9/2010 |
| WO | WO 2010-117669 | 10/2010 |

OTHER PUBLICATIONS

International Search Report for PCT International Application No. PCT/US2014/044307, mailed on Nov. 17, 2014, 4pgs.

* cited by examiner

*Primary Examiner* — Kuo-Liang Peng

(57) ABSTRACT

Curable compositions are provided comprising (i) at least one epoxy resin as specified (ii) an epoxide hardener system comprising (a) a carboxylic acid anhydride, (b) a first amine having a melting point from about 30 C to about 100 C and containing at least one primary amine group; and (c) a second amine having a melting point of from about 50 C to about 180 C and having at least one primary amine group, wherein the first and second amines are selected such that they have a difference in melting points of at least 10 C and wherein the first and second amines are contained in minor amounts by weight as compared to the carboxylic acid anhydride; and (iii) a filler as specified. Also provided are compositions obtainable by curing the curable composition, the use of the curable composition for filling of voids in honeycomb structures and processes for filing voids in honeycomb structures.

12 Claims, 1 Drawing Sheet

EPOXY RESIN-BASED COMPOSITION AS A FILLER HONEYCOMB CELLS

CROSS REFERENCE TO RELATED APPLICATIONS

This application is a national stage filing under 35 U.S.C. 371 of PCT/US2014/044307, filed Jun. 26, 2014, which claims priority to EP 13174347.8, filed Jun. 28, 2013, the disclosure of which is incorporated by reference in its/their entirety herein.

FIELD

In general, this disclosure relates to curable epoxy resin compositions suitable as fillers of honeycomb cells, in particular those used in aircraft, watercraft and automobiles, methods of filling cells of honeycomb structures, in particular honeycomb cores of sandwich composites, and to cells of honeycomb cores filled with cured epoxy resin compositions.

BACKGROUND ART

Transportation vehicles, such as automobiles, watercraft and in particular aircrafts frequently contain low weight materials to reduce fuel consumption. To achieve this purpose sandwich composites with honeycomb cores are frequently employed instead of solid structures. Also in the construction of buildings such honeycomb structures have found wide application. Typically, the honeycomb core is formed by a metal, e.g. aluminium, or fibreglass or composites, and the cells between the honeycomb core are void. The size of the void cells in a honeycomb structure influences the mechanical properties of the structure. The bigger the size the greater the weight reduction but the greater may be the loss of mechanical strength. Void cells in honeycomb structures may typically range from 5 mm up to 10 cm in at least one or all three dimensions. To counteract the potential loss of mechanical strength compared to solid structures, the cells of the honeycomb structure are partially or completely filled with filler materials (core fillers). Epoxy resin based compositions may be used for this purpose, for example those described in international patent application WO2010/117669 A1. The external surfaces of the honeycomb structures are often covered by facesheets, i.e. layers of resins, for example epoxy resins or phenolic resins, to further improve the overall stability of the honeycomb structures. Honeycomb structures covered by facesheets are also termed sandwhich composites with a honeycomb core. Composite materials, in particular prepregs (preimpregnated fibers) are increasingly used as face sheets because of their good fire retardant properties which are particularly important to the aircraft industry. It is often necessary to drill holes or mill patterns in the honeycombs, for example, during assembly or when installing the honeycombs at the desired place of a vehicle or building. This can lead to delamination of the facesheets from the epoxy-based core filler and requires subsequent application of adhesives. Also milling and cutting of the facesheets may lead to rough edges of the holes and structures formed, often requiring subsequent sanding to smoothen the rough edges in particular when cutting or milling through the interface of facesheet and core filler. This problem occurs with facesheets based on composites, in particular composites. Therefore, there is a need to provide improved core filler compositions for honeycomb structures.

SUMMARY

In the following there is provided the use of a curable composition comprising
(i) at least one epoxy resin comprising at least one repeating aromatic moiety,
(ii) an epoxy hardener,
(iii) a low molecular weight polyepoxy compound having the general structure

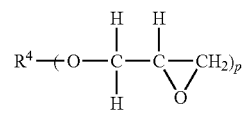

wherein $R^4$ is a p-valent moiety that is linear or branched, and preferably is aliphatic, and contains from 10 to 100 carbon atoms, p is an integer from 3 to 6, preferably p is 3 or 4, most preferably p is 3 as a filler of cells of a honeycomb structure.

In another aspect there is provided the use of a cured composition obtainable by curing the curable composition.

In a further aspect there is provided a honeycomb structure comprising cells filled with a composition comprising the cured composition.

In yet another aspect there is provided a wall panel or floor panel containing the honeycomb structure.

In a further aspect there is provided an aircraft selected from airplanes and helicopters comprising an interior wall or a floor panel containing the honeycomb structure.

In another aspect there is provided a process for filling cells of a honeycomb structure comprising applying the curable composition to the cells of the honeycomb structure and curing the composition.

DETAILED DESCRIPTION

Figure 1:
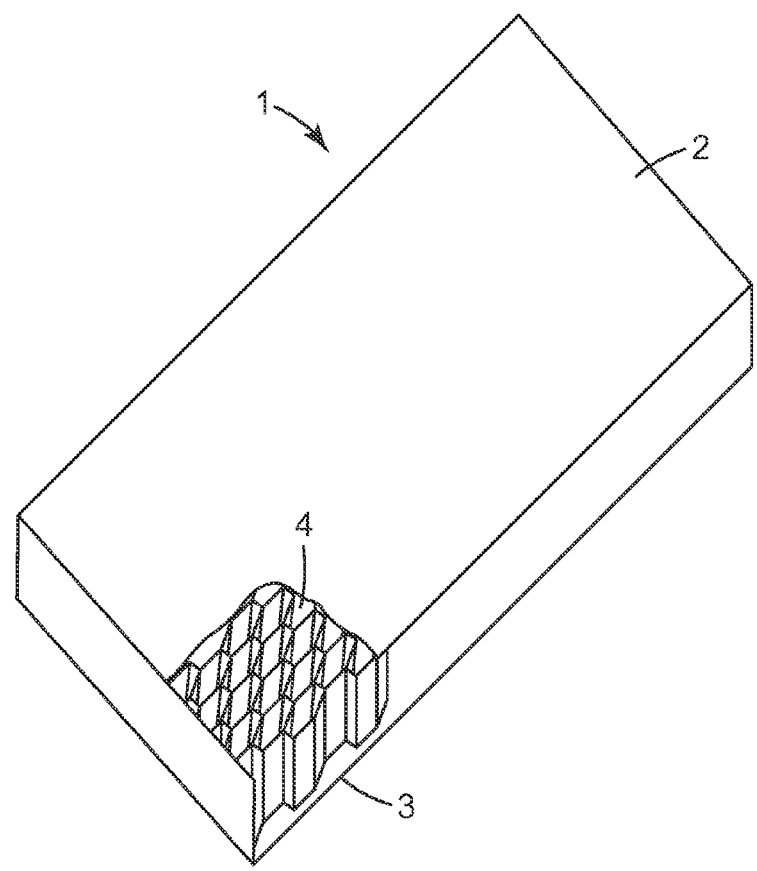
FIG. 1 shows a schematic representation of an embodiment of a sandwich composite with a honeycomb core.

Before any embodiments of this disclosure are explained in detail, it is to be understood that the disclosure is not limited in its application to the details of construction and the arrangement of components set forth in the following description. The invention is capable of other embodiments and of being practiced or of being carried out in various ways. Also, it is to be understood that the phraseology and terminology used herein is for the purpose of description and should not be regarded as limiting. Contrary to the use of "consisting", the use of "including," "containing", "comprising," or "having" and variations thereof is meant to encompass the items listed thereafter and equivalents thereof as well as additional items. The use of "a" or "an" is meant to encompass "one or more". Any numerical range recited herein is intended to include all values from the lower value to the upper value of that range. For example, a concentration range of from 1% to 50% is intended to be an abbreviation and to expressly disclose the values between the 1% and 50%, such as, for example, 2%, 40%, 10%, 30%, 1.5%, 3.9% and so forth.

Curable epoxy-based compositions are provided that may be used as filler materials, in particular when cured, to fill cells of a honeycomb structure. The curable compositions comprise:

(i) at least one epoxy resin,
(ii) at least one epoxy hardener system
(iii) at least one low molecular weight polyepoxy compound. The compositions may contain further additives as will be described in greater detail below.

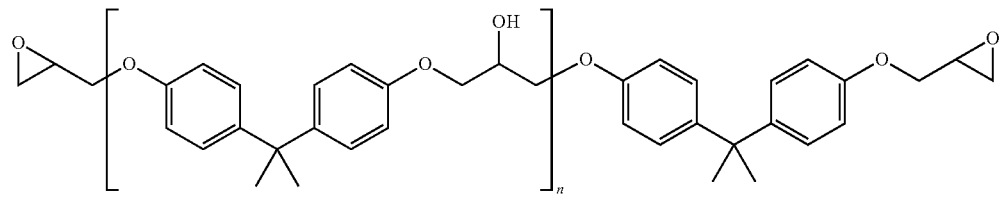

Epoxy resins:

Epoxy resins are polyethers having one or more, preferably terminal, oxirane ring (epoxy group). The epoxy-functionalities allow the resin to undertake cross-linking reactions in the presence of a curing agent. In typical embodiments of the present disclosure the epoxy resins, broadly called "epoxides", are cycloaliphatic or aromatic, which means they have one or more than one unit that is cycloaliphatic or aromatic. Useful materials generally have at least two, preferably terminal, epoxy groups per molecule and, more preferably, from two to four terminal epoxy groups per molecule. Typically, the epoxy resins may have an average epoxy-functionality of at least 1, greater than one, or of at least or about 2, or from about 1 to 4.

Preferably, the epoxy resins are or comprise aromatic glycidyl, diglycidyl or polyglycidyl ethers, i.e. the epoxy functionality is part of the glycidyl ether. Such epoxy resins may be obtained, for example, by the reaction of a hydroxyl functionalized arene (for example but not limited to dihydric or polyhydric phenols) with epichlorohydrine. As referred to herein, dihydric phenols are phenols containing at least two hydroxy groups bonded to the aromatic ring (also referred to as "aromatic" hydroxy groups) of a phenol—or in case of polyphenols at least two hydroxy groups are bonded to the same aromatic ring or to different aromatic rings. Therefore, the term "dihydric phenols" is not limited to phenols or polyphenols containing two "aromatic" hydroxy groups but also encompasses polyhydric phenols, i.e. compounds having more than two "aromatic" hydroxy groups. Examples of useful dihydric phenols include resorcinol, catechol, hydroquinone, and polyphenols including p,p'-dihydroxydibenzyl, p,p'-dihydroxyphenylsulfone, p,p'-dihydroxybenzophenone, 2,2'-dihydroxyphenyl sulfone, p,p'-dihydroxybenzophenone, 2,2-dihydroxy-1,1-dinaphrhylmethane, and the 2,2', 2,3', 2,4', 3,3', 3,4', and 4,4' isomers of dihydroxydiphenylmethane, dihydroxydiphenyldimethylmethane, dihydroxydiphenylethylmethylmethane, dihydroxydiphenylmethylpropylmethane, dihydroxydiphenylethylphenylmethane, dihydroxydiphenylpropylenphenylmethane, dihydroxydiphenylbutylphenylmethane, dihydroxydiphenyltolylethane, dihydroxydiphenyltolylmethylmethane, dihydroxydiphenyldicyclohexylmethane, and dihydroxydiphenylcyclohexane.

In preferred embodiments the epoxy resins include epoxy resins containing or consisting of glycidyl ethers or polyglycidyl ethers of monohydric, dihydric or polyhydric phenols, such as for example, but not limited to, epoxy resins based on bisphenol A, bisphenol F including blends thereof and combinations thereof. Such bisphenol A or bisphenol F based glycidyl ether resins comprise repeating units derived from these phenols, e.g. reaction products of the polymerisation of phenols with epichlorohydrine and subsequent reaction with a base to convert the chloride groups into hydroxyl groups. Such resins can be represented by the general formula where n represents an integer to indicate the repeating unit. The above formula shows a bisphenol A glycidylether epoxy resin (also referred to as bisphenol A gylcidyl ether resin).

Instead of, or in addition to, the aromatic epoxy resins described above also their fully or partially hydrogenated derivatives (i.e. the corresponding cycloaliphatic compounds) may be used.

The epoxy resins are preferably liquid at room temperature or present in dissolved form. In some specific embodiments the resins have a low viscosity at 25° C., for example a viscosity of from about 3 to about 20 Pa·s., for example from about 4 to 6 Pa·s. (ASTM D445). In some specific embodiments the resins may have an epoxy group content of about 5600 to 5800 mmol/kg. In some specific embodiments the resins contain 150 to 180 grams of resin per 1 epoxy equivalent.

Examples of commercially available epoxy resins include diglycidylether of bisphenol A (e.g. available under the trade designation EPON 828, EPON 830 or EPON 1001 from Hexion Speciality Chemicals GmbH, Rosbach, Germany, or under the trade designation D.E.R-331 or D.E.R-332 from Dow Chemical Co,); diglycidyl ether of bisphenol F (e.g. EPICLON 830 available from Dainippon Ink and Chemicals, Inc. or D.E.R.-354 from Dow Chemical Co, Schwalbach/Ts., Germany); silicone resins containing diglycidyl epoxy functionalities; flame retardant epoxy resins (e.g. DER 580, a brominated bisphenol type epoxy resin available from Dow Chemical Co.); Other epoxy resins based on bisphenols are commercially available under the trade designations EPIKOTE (Hexion Speciality Chemicals, Rosbach, Germany) or EPILOX (Leuna Epilox GmbH, Leuna, Germany). Epoxy novolacs are available under the trade designation D.E.N. from Dow Chemical Co, Schwalbach/Ts., Germany.

Typically, the compositions provided herein comprise 10 to 70 percent by weight, preferably from 15 to 60 percent by weight, more preferably from 15 to 55 percent by weight and especially preferably from 15 to 50 percent by weight of one or more epoxy resin.

Mixtures of various epoxy resins may also be used in the compositions of the invention and these mixtures may include blends of aromatic epoxy resins, like for examples blends of bisphenol A epoxy resins and bisphenol F resins or blends of an aromatic epoxy resins with aliphatic epoxides which may be cyclic or acyclic.

Epoxy-hardener:

The compositions further contain one or more than one epoxy hardener. Epoxy hardeners are curing agents, i.e. compounds that react with the oxirane ring of the epoxide to cause cross-linking. However, instead of a single curing agent an epoxy hardener system maybe present, i.e. a combination of curing agents, or a combination of curing agent(s) and curing catalysts.

The amounts of curing agents to epoxy resin are chosen such that they have about equal equivalent weights, i.e. the molar amounts of reactive anhydride groups (or reactive amino groups in case of amino-based curing agents) to reactive epoxy groups is about 1:1 or from 0.8:1 to about 1:0.8.

The epoxy hardener or hardener system is chosen to control the curing rate and the activation of the curing. For example, many amino-functionalised curing agents with sterically unhindered primary amino groups (—NH$_2$ groups) are reactive with the epoxy resins at room temperatures. To avoid premature curing, the curable compositions are provided as two component (2K) formulations with the curing agents separated from the epoxy resins. The two components are combined prior to their application on the substrate to avoid premature curing.

Anhydride-based curing agents typically become activated at higher temperatures and may be used in one component (1K) formulations.

Amine-based Curing Agents:

Amine-based curing against contain at least one primary amino (—NH$_2$) group. Typical examples can be represented by formula (I):

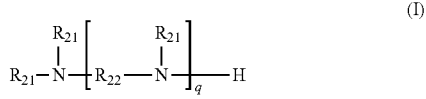

(I)

with the proviso that $R_{21}$ are chosen such that the molecule contains at least one —NH$_2$ groups. Each $R^{22}$ is independently an alkylene, heteroalkylene, or combination thereof. Suitable alkylene groups often have 1 to 18 carbon atoms, 1 to 12 carbon atoms, 1 to 8 carbon atoms, 1 to 6 carbon atoms, or 1 to 4 carbon atoms. Suitable heteroalkylene groups have at least one oxy, thio, or —NH— group positioned between two alkylene groups. Suitable heteroalkylene groups often have 2 to 50 carbon atoms, 2 to 40 carbon atoms, 2 to 30 carbon atoms to 20 carbon atoms, or 2 to 10 carbon atoms with up to 20 heteroatoms, up to 16 heteroatoms, up to 12 heteroatoms, or up to 10 heteroatoms. The heteroatoms are often oxy groups. The variable q is an integer equal to at least one and can be up to 10 or higher, up to 5, up to 4, or up to 3. Each $R^{21}$ group is independently hydrogen, alkyl, aryl, or alkylaryl. Suitable alkyl groups for $R^{21}$ often have 1 to 12 carbon atoms, 1 to 8 carbon atoms, 1 to 6 carbon atoms, or 1 to 4 carbon atoms. The alkyl group can be cyclic, branched, linear, or a combination thereof. Suitable aryl groups for $R^{21}$ often have 6 to 12 carbon atoms such as a phenyl group. Suitable alkylaryl groups for $R^{21}$ can be either an alkyl substituted with an aryl or an aryl substituted with an alkyl. The same aryl and alkyl groups discussed above can be used in the alkylaryl groups. Some amine curing agents can have an $R^{22}$ group selected from an alkylene group. Examples include, but are not limited to, ethylene diamine, diethylene diamine, diethylene triamine, triethylene tetramine, propylene diamine, tetraethylene pentamine, hexaethylene heptamine, hexamethylene diamine, 2-methyl-1,5-pentamethylene diamine. Other amine curing agents can have an $R^{22}$ group selected from a heteroalkylene group such as a heteroalkylene having oxygen heteroatoms. For example, the curing agent can be a compound such as aminoethylpiperazine, 4,7,10-trioxatridecane-1,13-diamine (TTD) available from TCI America in Portland, Oreg., or a poly(alkylene oxide) diamine (also called polyether diamines) such as a poly(ethylene oxide) diamine, poly (propylene oxide) diamine, or a copolymer thereof. Commercially available polyether diamines are commercially available under the trade designation JEFFAMINE form Huntsman Corporation in The Woodlands, Tex., USA.

Still other amine curing agents can be formed by reacting a polyamine (i.e., a polyamine refers to an amine with at least two amino groups selected from primary amino groups and secondary amino groups) with another reactant to form an amine-containing adduct having at least two amino groups. For example, a polyamine can be reacted with an epoxy resin to form an adduct having at least two amino groups. If a polymeric diamine is reacted with a dicarboxylic acid in a molar ratio of diamine to dicarboxylic acid that is greater than or equal to 2:1, a polyamidoamine having two amino groups can be formed. In another example, if a polymeric diamine is reacted with an epoxy resin having two glycidyl groups in a molar ratio of diamine to epoxy resin greater than or equal to 2:1, an amine-containing adduct having two amino groups can be formed. A molar excess of the polymeric diamine is often used so that the curing agent includes both the amine-containing adduct plus free (non-reacted) polymeric diamine. For example, the molar ratio of diamine to epoxy resin with two glycidyl groups can be greater than 2.5:1, greater than 3:1, greater than 3.5:1, or greater than 4:1. Even when epoxy resin is used to form the amine-containing adduct in the second part of the curable composition, additional epoxy resin is present in the first part of the curable composition.

In preferred embodiments the epoxy hardener is anhydride-based. The epoxy hardenercomprises or is a carboxyl acid anhydride. Anhydride-based curing agents include known curing agents and include but are not limited to phthalic acid anhydrides, such as, for example, tetrahydroxy phthalic acid anhydrides or norbornenephthalic acid anhydrides.

Compositions containing anhydrides as primary curing agents may be formulated as one component compositions. Primary curing agents as used herein mean that the curing agents are present in major amounts. Other curing agents may also be present but in minor amounts, typically in amounts 10 times or 100 times less than the amount of the primary agents (the amounts are based on weight), or 20 to 50 times less than the amount of the primary agent.

In some embodiments the epoxy hardener system comprises a carboxylic anhydride as curing agent and at least one amine curing agent. The anhydride is the primary curing agent. Preferably the amines are less reactive such that the compositions may be formulated as one component compositions. Examples of such amines include but are not limited to cyclic amines containing no primary amino groups or only sterically hindered primary amino groups, e.g. a primary amino groups bonded to the ring or as part of a short chain aminoalkyl residue bonded to the ring, i.e. a ethylamino, propyl amino, isopropyl amino or isobutyl amino residue bonded to the ring. Examples include but are not limited to imidazoles, imidazolines, piperazines, morpholines and derivatives and salts thereof. Specific examples include, for example, 2-(2-(2-methylimidazolyl)-ethyl)-4,6-diamino-s-triazine, commercially available, for example under the trade designation CUREZOL 2MA-OK. Other suitable secondary curing agents include phenols substituted with tertiary amino groups. A particular example includes tris-2,4,6-(dimethylaminomethyl)phenol, commercially available under the trade designation ANCAMINE K54 from Air Products Chemicals, Inc. of Allentown, Pa., USA. Other examples include, but are not limited to, 1-amino-3-aminomethyl-3,3,5-trimethylcyclohexane (also called isophorone diamine), aminoethylpiperazine and the like.

In another embodiment the hardener system comprises at least one anhydride and a combination of first and second amines. The first amines used in the epoxy hardener system may be amines having a melting point of from about 30° C. up to about 100° C., preferably from about 40° C. up to about 90° C., more preferably from about 60° C. to about 80° C. The first amines are preferably aliphatic amines, meaning they do not contain an aromatic residue. The first amines preferably contain at least one primary amine residue (i.e. an —NH$_2$ residue). The first amines may be linear or branched, cyclic or acyclic. The first amines may be linear or branched amines of the general structure (II):

wherein the residues $R^1$,

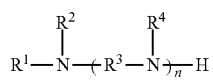

$R^2$, and $R^4$, independently from each other, may represent hydrogen or a hydrocarbon (such as an alkyl) or an alkoxy or a polyoxyalkyl residue. $R^3$ represents a hydrocarbon, an alkylether or a polyether alkyl residue. More preferably $R^3$ is a polyetheralkyl residue. Preferably, the residues $R^1$, $R^2$, and $R^4$ are chosen such that the amine contains at least one or two primary amine groups; n represents an integer. Suitable polyether amines include those that can be derived from polypropylene oxide and/or polyethylene oxide. The second amines include amines having a melting point of from about 50° C. up to about 180° C., preferably from about 70° C. to less than about 150° C., more preferably from about greater than 80° C. to less than about 129° C. The second amines may be of the same or different chemical type than the first amines. Preferably, the second amines are aliphatic, more preferably, cycloaliphatic (which means they do contain aliphatic or cycloaliphatic moieties but do not contain aromatic moieties). The cycloaliphatic amines as used herein mean that the amine contains one or more than one cycloaliphatic residues. The cycloaliphatic amines are preferably primary amines and contain at least one primary amine group.

Typical examples of cycloaliphatic amines include primary amines containing one or two or more than two cyclic residues (such as, for example, cyclohexyl, cycloheptyl, or cyclopentyl residues or combinations thereof). Typically, the second amines are used in equal amount or in excess with respect to the first amines. Typically, the first and second amines are used in minor amounts compared to the anhydrides, such as for example from 0.5 to 20% or from 1 to 12% by weight based on the total amount of anhydrides used in the hardening system, or based on the total amount of hardeners used in the composition. The first and second amines are chosen such that they have a difference in melting points of at least 10° C.

Curing Catalysts:

The curable compositions may also include curing catalysts, which include calcium nitrates or triflates. These salts may accelerate the curing reaction.

The compositions as provided herein may typically comprise from about 10 to about 40% weight based on the weight of the total composition of epoxy hardeners or of an epoxy hardener system.

Low Molecular Weight polyepoxy Compound

The low molecular weight polyepoxy compound contains at least three epoxy units, preferably glycidyl ether units. Preferably it is aliphatic and more preferably aliphatic and acyclic. In preferred embodiments it is monomeric and does not contain repeating units derived from a ring opening reaction of the epoxy functionalities. Suitable compounds can be represented by formula (III):

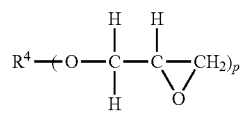

In formula (III), group $R^4$ is a p-valent moiety that is preferably aliphatic and contains from 10 to 100 carbon atoms, preferably from 15 to 80 carbon atoms and p is an integer from 3 to 6, preferably p is 3 or 4, most preferably p is 3. In many embodiments $R^4$ is a linear or branched hydrocarbon or a linear or branched heterohydrocarbon, which maybe saturated or unsaturated. Heterohydrocarbons as meant herein are hydrocarbons containing one or more heteroatoms interrupting the hydrocarbon chain, so called catenary heteroatoms. Such catenary heteroatoms are typically oxygen atoms and residue $R^4$ may represent a polyether moiety. In some embodiments $R^4$ contains a polyol, for example glycerol, whose hydroxyl groups have been modified to contain glycidyl ether carrying substituents. Examples include propoxylated glycerol glycidyl ether, ethoxylated glycerol glycidyl ether and ethoxylated and propoxylated glycerol glycidyl ethers. Other examples include esters of glycidiyl ether group carrying carboxylic acids and polyols, like but not limited to glycerol.

An example of a propoxylated glycerol glycidyl ethers is represented by formula (IV):

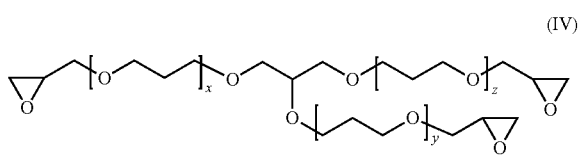

where x, y and z are integers greater than 0 and may be different or identical.

An example of esters of polyols and gylcidyl ether groups containing carboxylic acids includes castor oil triglycidyl ether shown in formula (V):

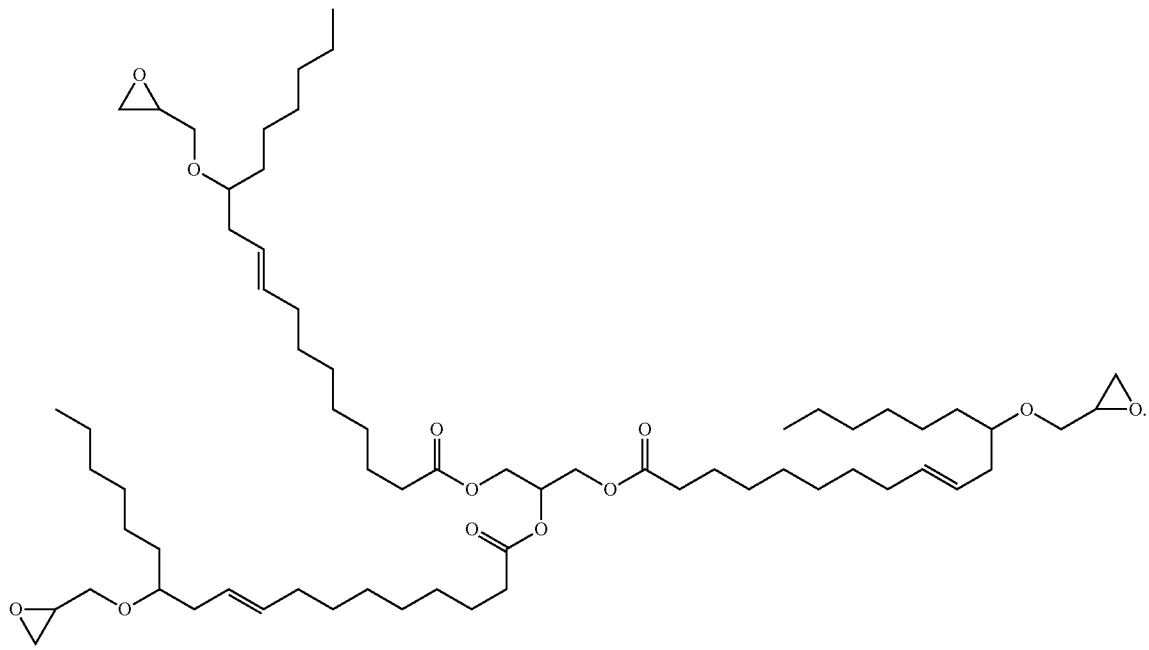

(V)

Propoxylated glycerol triglycidyl ethers and castor oil triglycidyl ethers are commercially available, for example, under the trade designation ERYSIS GE-35 and ERYSIS GE-36 from CVC Specialty Chemicals Inc, Moorestown, N.J., USA.

These materials increase the flexibility of the cured compositions and it is believed that the increased flexibility helps to improve the compatibility of the cured compositions with other resins, for example other epoxy resins or phenolic resins during cutting, drilling or milling action and reduce the occurrence of rough or fractured edges. It is understood that the low molecular weight polyepoxides may also be present as mixtures containing different low molecular weight poly epoxides. Typical amounts of the low molecular weight polyepoxides include amounts from about 0.5 to about 5% by weight based on the total weight of the composition. Optimum amounts depend on the actual formulation chosen and can be determined by routine experiments.

It was found by the inventors that also a good balance between processing properties (e.g. preferably paste-like consistency) and mechanical strength at ambient and elevated temperatures, e.g. as measured as compressive strength at 23° and 80° C. can be achieved by embodiments described herein. Moreover, embodiments additionally having low exothermic heat released upon curing and long shelf-life at room temperature can be obtained by the compositions described herein.

It is understood that additives may be added to the compositions to further improve specific properties of the compositions. For example, to provide more fire retardant embodiments, fire retardants or a combination of fire retardants may be added, for example those described below. To provide more light weight embodiments the compositions may further comprise at least one filler material capable of reducing the density of the composition, for example the materials described below.

The composition of the present invention may comprise further ingredients (additives) to further regulate rheological properties or mechanical properties, adapt the visual appearance of the compositions or may help to prevent premature degradation of the compositions. These additional materials include, for example, fillers other than those described above, thixotropic agents, reactive diluents, pigments, antioxidants, adhesion promoters and the like.

Fillers Capable of Reducing Density:

The compositions may further comprise filler capable of reducing the density of the composition. Capable of reducing the density of the composition as used herein means the filler has a lower density than the composition without the filler. Typically, the compositions may comprise 15 to 60 weight percent of such filler. Fillers capable of reducing the density of the precursor includes low density inorganic fillers, (i.e., fillers having a density of between 0.1 to 0.5 $g/cm^3$), low density organic fillers (i.e., fillers having a density of between 0.01 to 0.30 $g/cm^3$) but low density inorganic fillers are preferred over organic fillers because the letter tend to negatively influence the compressive strength. A combination of organic and inorganic fillers may be used but the inorganic low density fillers are preferably used in excess over the organic fillers.

The low-density inorganic fillers are preferably selected from inorganic particles, inorganic microspheres and in particular hollow inorganic microspheres. The microspheres may be selected from a variety of materials including by way of example glass, silica, ceramic (including sol-gel derived) or zirconia.

The fillers are preferably selected so that they allow for an advantageous density of the cured composition without sacrificing its compressive strength. The hollow inorganic microspheres exhibit a density of less than 0.5 $g/cm^3$, more preferably of between 0.12 and 0.42 $g/cm^3$. The fillers may have an average particle size (number average) typically of less than 500 µm, or between 10 and 100 µm. Preferred hollow inorganic microspheres include glass microspheres which are commercially available, for example, from 3M Company under the trade designation Glass bubbles D32 or Scotchlite D32/4500.

Unexpanded organic hollow microsphere fillers are available, for example, from Akzo Nobel under the trade designation "Expancel®". Unexpanded organic hollow microspheres are sometimes also referred to as expandable organic microballoons which are also available, for example, from Lehmann and Voss, Hamburg, Germany under the trade designation MICROPEARL. Pre-expanded organic hollow microspheres are commercially available, for example, from Lehmann & Voss, Hamburg, Germany under the trade designation DUALITE.

The concentration and the nature of the fillers used in the curable compositions is preferably selected such that the density of the cured composition is less than 1 g/cm$^3$, more preferably less than 0.9 g/cm$^3$ and most preferably between 0.5 and 0.8 g/cm$^3$, like for example between 0.6 and 0.7 g/cm$^3$.

Fire Retardants:

The precursors and cured compositions of the present invention may further comprise a fire-retardants or a system comprising several fire retardants. Examples include compound selected from alkaline earth metal hydroxides, aluminium group hydroxides, and phosphorous-containing materials, phosphates and phosphinates including combinations thereof. Alkaline earth metal hydroxides and aluminium group hydroxides are often used as smoke suppressants. Especially preferred compounds include aluminium trihydrate (=aluminium oxide trihydrate, sometimes also referred to as aluminium hydroxide) and magnesium hydroxide.

The phosphorous-containing material may be elemental red phosphorous or embedded or encapsulated phosphorus. Examples of phosphates include but are not limited to melamine phosphate, dimelamine phosphate, melamine pyrophosphate and inorganic phosphinates such as, for example, aluminium phosphinates. Elemental red phosphorous and inorganic phosphinates are preferred.

The fire-resistant system may also include an optional boron-containing material, such as those selected from the group consisting of barium metaborates, calcium metaborates, zinc metaborates and mixtures thereof.

The precursors and cured compositions typically comprise the fire-retardants from about 5 up to about 50 weight percent and preferably from 10 to 25 weight percent based on the weight of the total composition.

Reactive diluents and thixotropic agents may be added to control the flow characteristics of the curable composition.

Thixotropic agents are known in the art and typically are particulate materials having number average particle sizes of less than 50 nm. Preferred thixotropic agents include fumed silica. Thixotropic agents are commercially available under the trade designation Cab-O-Sil from Cabot, Schwalbach im Taunus, Germany, or Aerosil from Degussa Evonik GmbH, Frankfurt, Germany.

Reactive diluents may be added to reduce the viscosity and improve flowability of the composition. Typical examples include monomeric epoxides containing one or two epoxy groups preferably at a terminal position. Preferably, the reactive diluents have a saturated or unsaturated cyclic backbone. Preferred reactive terminal epoxydes are glycidyl ethers. Examples of suitable diluents include the diglycidyl ether of resorcinol, diglycidyl ether of cyclohexane dimethanol and diglycidyl ether of neopentyl glycol.

Further materials include wetting agents, which are preferably selected from the group consisting of titanates, silanes, zirconates, zircoaluminates, phosphoric ester(s) and mixtures thereof. Wetting agents improve the mixability and processability of the composition and can also facility the dispersion of the composition on the substrates. An especially useful wetting agent is commercially available as Coatex DO-UP6L from Coatex, Genay, France. The concentration of the wetting agent component comprising one or more wetting agents is typically lower than 6 percent by weight and more preferably not more than 5 percent by weight based on the total weight of the composition.

Pigments may include inorganic or organic pigments including ferric oxide, brick dust, carbon black, titanium oxide and the like.

The compositions may further comprise toughening agents. Toughening agents are polymers, other than the epoxy resins, capable of increasing the toughness of cured epoxy resins compared to the same composition not containing them (the difference in amount in such comparison studies is made up by the epoxy resin) and which are otherwise treated identically. Typical toughening agents include, for example, core-shell polymers or liquid butadiene-nitrile rubbers. Some embodiments of the present disclosure do not contain any toughening agents.

Preparation

The curable compositions of the invention can be readily prepared by a number of techniques. For example, the various components may be added under ambient conditions to a suitable mixing vessel, such as a Mogul mixer. The vessel is preferably cooled to prevent reaction of the components during preparation and to facilitate removal of any heat generated during manufacture. Preferably the curable composition (also referred to herein as "precursor") is mixed at a temperature of less than 35° C. Additionally, slow mixing speeds are generally used to help prevent heat build-up in the mixer. Mixing is continued until the components form a homogeneous mixture, after which time the precursor is removed from the mixer.

In case of two component compositions the epoxy resin containing part can be prepared as described above except for the curative agents. The curative component is prepared separately by mixing the curative and any additional ingredients if necessary. Both parts are combined prior to use.

Preferably the curable compositions provided herein are extrudable pastes. Preferably they are not in the form of a powder. In typical embodiments extrudable pastes have an initial extrusion rate measured as described in the test section below of at least 50 g/min. More preferably, the initial extrusion rate is from 50 g/min up to 300 g/min. In many embodiments the curable compositions show a slow increase of viscosity over time at ambient temperatures. Typically the curable compositions can be processed by pumps or other conventional application equipment.

Desirably the curable compositions show good exothermic behaviour. Favourably the materials exhibit good mechanical properties, for example, high compressive strength. In some embodiments the cured compositions have compressive strength of greater than 30 MPa at room temperature (20° C.) and greater than 20 MPa at 80° C.

In some embodiments the cured compositions have a density of less than 0.8 g/cm$^3$, for example a density of between 0.6 and 0.7 g/cm$^3$.

In some embodiments the precursors are one-part compositions, i.e. they already comprise the hardener component as compared to two-part composition, where the hardening components are kept separated from the epoxy resin until use of the compositions. One-part precursors of the present invention preferably exhibit a good shelf life time at room temperature. One-part compositions contain a reactive system and are therefore, preferably kept at low temperatures for storage. The shelf life at room temperature as referred to herein can be determined by measuring the time (from preparing the composition or from the time it has reached room temperature (20° C.) after having been kept at −18° C. until the composition thickens such that it becomes more difficult or impossible to extrude. A slow rate of thickening is acceptable. A composition is considered to have a good shelf life at room temperature, if its extrusion rate (as measured according to the methods described below) is greater than 60 g/min after storage for 5 days at room temperature. The one-part compositions comprise a hardening system containing as a major component an anhydride-based curing agent as described above. In preferred embodiments the one component compositions contain at least one anhydride-based curing agent and at least one secondary curing agent, preferably an amine curing agent.

The curable compositions can be applied to various substrates, such as, for example, metals (for example, Al, Al alloys, titanium or steel) but also to other substrates comprising, for example, glass, boron, carbon, Kevlar fibers, epoxy resins, phenolic resins, cyanate esters and polyester matrices. Typically, such substrates are the grid of a honeycomb structure.

The curable compositions may be applied, for example, as a thin coating but are preferably used for the preparation of bulky articles like, for example, honeycomb structures. Such honeycomb structures may be used in the construction of floor panels or wall panels, in particular interior walls used in watercraft or aircrafts or buildings. Typically the honeycomb structure are the internal layer of a sandwich composite containing two identical of different external layers covering at least partially and preferably covering fully the top and bottom surface of the honeycomb structure.

The curable compositions are typically applied to the substrates and subsequently cured, preferably by thermal curing. The compositions may be applied using standard equipment for applying pastes, for example pumps, hand-held extrusion guns or other injection equipment like syringes suitable to inject pastes. The curing conditions can vary widely depending on the specific application and depending on the curing system used. In some embodiments the curing system contains an anhydride-based primary curing agent and the curing temperature is typically between 80 and 180° C., preferably at 175° C. The curing time typically is between 15 and 180 minutes, preferably 2 hours. Preferably, the compositions can be completely cured at 175° C. after a curing time of 120 minutes.

In some embodiments the curable epoxy-based compositions can be prepared that exhibit good processability and exhibit both an advantageous initial viscosity (evaluated, for example, in terms of initial extrusion rate) and a low increase of viscosity with time (evaluated, for example, in terms of initial extrusion rate and extrusion rates after 3 days or 5 days, respectively, as described in the methods below).

In some embodiments curable epoxy-based compositions can be prepared that exhibit low exothermicity upon curing (evaluated, for example, in terms maximum exothermic peak during the curing reaction according to the method described below). Compositions are considered to have a low exothermicity if their exothermicity is less than 60° C., preferably less than 55° C.

Epoxy-based compositions which are obtainable by curing the corresponding curable precursor compositions can be prepared that exhibit advantageous mechanical properties evaluated, for example, in terms of compressive strength. In particular the cured compositions have good compressive strength at room temperature but also at elevated temperatures. By using the above-mentioned ingredients compositions having one or more or all of the following properties can be prepared:

a) curable compositions having an initial extrusion rate measured as described in the method section below of between from 50 g/min to about 300 g/min;
b) curable compositions having an initial extrusion rate measured as described in the method section below after 3 days storage at room temperature of from about 50 g/min up to about 200 g/min and after 5 days storage at room temperature of from about 50 g/min and up to 150 g/min;
c) curable compositions having an exothermic peak of less than 60° C. measured as described in the method section below;
d) curable compositions that when cured have a compressive strength of at least 25 MPa at 23° C.
e) curable compositions that when cured have a compressive strength of at least 20 MPa at 80° C.
f) curable compositions that when cured have a compressive strength of at least 40 MPa at 23° C.
g) curable compositions having properties a) and b) or a), b) and c), or a), b), c), and d), or a), b), c), d) and e) or a), b), c), d), e), f) and g).

In some embodiments curable compositions further containing the fire retardant system as described above can be prepared that exhibit when cured a burn length of less than 150 mm, an after flame time of less than 15 s, an after flame drip of less than 3 s at a vertical Bunsen burner at 60 s as measured according to the methods described below.

Furthermore, curable compositions further containing the fire retardant system as described above can be prepared that when cured exhibit an optical smoke density as measured according to the methods described below of less than 200.

The precursor compositions contain the above-mentioned ingredients in such amounts that upon curing the desired chemical and mechanical properties will be achieved.

In a typical embodiment the precursor composition comprises about 10 to 70% by weight of epoxy resin, about 1 to 55% by weight of the epoxide hardener system, preferably including an anhydride-based hardener, 0.5 to 5% by weight of the low molecular weight polyepoxy compound, and, optionally, about 5 to 50% by weight of the fire retardant system and, optionally, about 10 to 60% by weight of the filler capable of reducing the weight of the composition, wherein the percentages by weight are based on the total amount of the composition and the total amount of the weight percentages gives 100%.

The curable compositions are particular useful as core filler for honeycomb structures, in particular honeycombs used in aircrafts and in particular honeycombs used in the interior of an aircraft, for example in interior walls or in floor panels. Typical embodiments are capable of withstanding the forces encountered when used at the interface of a pressurized and non-pressurized zone of a passenger aircraft.

Figure 2:
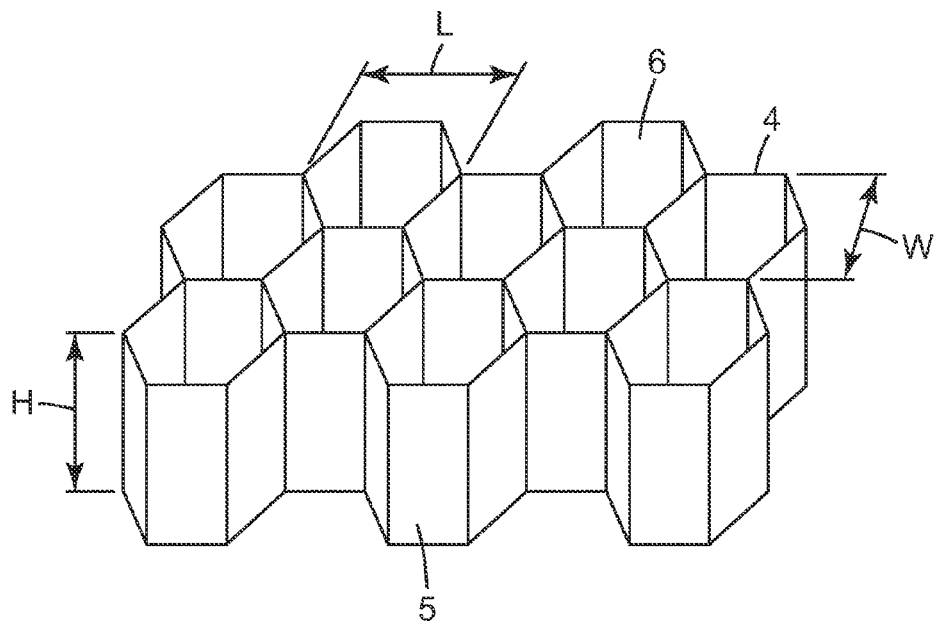
FIG. 2 shows a schematic representation of a honeycomb structure with a honeycomb frame and individual cells within the honeycomb frame.

The honeycomb structures may be part of a sandwich composite containing an internal honeycomb core. An embodiment of a typical honeycomb sandwich composite is represented in FIG. 1. In FIG. 1 a perspective view of a honeycomb sandwich composite (1) is shown. The honeycomb core (4) is sandwiched between two facesheets, the external layers: top layer (2) and bottom layer (3). The layers may be sheets or coatings. The sheets may be laminated or adhesively bonded to the honeycomb structure or its filler or may be co-cured with the cell filler. The honeycomb structure is shown in greater detail in FIG. 2. The honeycomb structure (4) has a honeycomb frame (5) containing cells (6). The cells may be rectangular or hexagonal and in FIG. 2 the cells have the shape of hexagons. The cells in a honeycomb structures may typically range from 0.4 cm up to 15 cm in at least one or all three dimensions (maximum length, maximum width and maximum height of the cell). The dimensions of a cell are indicated in FIG. 2 as length (L), width (W) and height (H). The cells may be rectangular or hexagonal or may have any other shape. The honeycomb frame surrounding the cells is typically made of metal, for example but not limited to steel and aluminium. The honeycomb frame may also be not metallic and contain fibers or fibers composites, like glass fiber composite or carbon fiber composites.

In some embodiments at least one of the external surface of the honeycomb is at least partially covered by a layer comprising a composite material containing fibers embedded in a resin, e.g. a prepreg (preimpregnated fiber materials). The resin may be an epoxy resin as described above or a phenolic resin as described below and including blends or combinations thereof. The layer may be, for example, in the form of a coating or a sheet. The sheet may be laminated or adhesively bonded or fixed to the honeycomb structure mechanically or is co-cured with the cell filler. Phenolic resins as referred to herein are polymeric materials based on the reaction-product of one or more phenol and one or more aldehyde, typically formaldehyde. In the latter case the phenolic resins are also referred to as phenol-formaldehyde resins. Phenolic resins also include novolac resins. Novolacs comprise the reaction product of an epoxy group-introducing agent, such as for example epichlorohydrine, with a condensation product of a mono- di or polyhydric phenol and an aldehyde, such as for example, formaldehyde. The phenol may be alkylsubstituted (e.g. cresol) or non-substituted). Typical epoxy novolacs are polymers containing glycidyl ether groups and further comprising repeating units derived from the condensation of bisphenol F, bisphenol A or another phenol or polyphenol with an aldehyde.

The fibers of the composite materials include, for example, inorganic fibers and organic fibers. Inorganic fibers include glass fibers, ceramic fibers and carbon fibers. Organic fibers include polyamide fibers, for example aromatic polyamides like aramide fibers. Commercial phenolic prepregs include, for example, HexPly®93 and HexPly®200 available from Hexcel Corporation, Stamford, Conn., USA.

The present disclosure is furthermore illustrated by the examples described below without intention to limit the disclosure to any specific examples and embodiments. Prior to that some test methods used to characterize the precursors and cured epoxy-based composition will be described. Unless specified otherwise, percentages are percentages by weight with respect to the mass of the precursor or the cured epoxy-based composition, respectively. Above and below, the mass percentages of all components of a precursor or a cured composition, respectively, add up in each case to 100 weight percent.

Methods
Extrusion Rate

The processability of the precursor of the low-density epoxy-based composition was evaluated at room temperature (23° C.) by extruding it through standard equipment using the following procedure. An air driven application pistol (available from SEMCO, East Kilbride, U.K) was fitted with a 150 ml disposable cartridge and a nozzle having an aperture of 6.35 mm. The disposable cartridge was filled with precursor and by applying an air pressure of 5 bars the low-density epoxy composition was extruded. The extrusion rate was determined by measuring the quantity extruded in 60 seconds.

Measurements are made immediately after the precursor was prepared (initial extrusion rate). Each precursor is typically evaluated 3 times and the results averaged.

Additional measurements are done after the precursor was kept 3 days (or 5 days, respectively) at a temperature of 23(±2) ° C. and 50% relative humidity.

Compressive Strength 200 g of the precursor were cast into a release-coated mould having the dimensions of 12.5 mm (height)×12.5 mm (width)×25mm (length) and being open on one major side. The mould was placed in a forced air oven and subjected to a curing program comprising two curing cycles. For the first curing cycle the oven temperature was raised from 20° C. to 125° C. using a heating rate of 3° C./min. The temperature was held at 125° C. for 1 hour then the temperature was cooled down to 20° C. over a period of 45 minutes.

All test specimens were compressed along their 25 mm axis at a rate of 0.5 mm/min by using a Zwick Model Z030 Tensile Tester (Zwick GmbH & CO., Ulm, Germany), equipped with heating capability.

Compressive strength was measured at 23° C. (room temperature) and 80° C. The test specimens were preconditioned in the heated equipment for at least 30 minutes before testing at 80° C.

Three samples were measured for each epoxy composition prepared and the results were averaged.

Optical Smoke Density

A sheet having a thickness of 3-5 mm is prepared by pouring the composition into an aluminium release-treated mould and curing it in an air forced oven using the same curing cycle from 23° C. to 125° C. as described previously for the compressive strength test. Samples having the dimensions of 3 mm×75 mm×75 mm are then cut from this large sheet. The surface of one side is abraded with sandpaper to insure that the exposed resin is representative of the overall composition.

The NBS smoke density chamber (NBS=National Bureau of Standards) is used to measure smoke density. This test method is described in detail in JAR/FAR Part 25, amdt. 25-66, Appendix F, Part V (JAR/FAR=Joint Aviation Requirements/Federal Aviation Regulations); see also Airbus Directive ABD 0031, "Fireworthiness Requirements, Pressurised Section of Fuselage", Issue D, September 2002, section 5.4 "smoke-density". A sample of the epoxy-based composition is placed over a gas flame of specific dimension. Smoke generated in the chamber is measured by light transmission of a vertical light beam through the air space in the oven.

Three samples of each epoxy-based composition are typically tested and the results averaged.

Vertical Burn Test

The vertical burn test is performed according to Airbus Directive ABD 0031, Issue September 2002. Three test specimens with a dimension of 3mm×75 mm×300 mm are cut off a 3 mm×400 mm×400 mm panel of epoxy composition cured in an aluminium mould. The epoxy composition is extruded in the mould of a SEMCO cartridge. The mould is cured in an air forced oven for 60 minutes at 125° C. with a heat-up rate of 3° C./min.

The specimens are then tested in a flammability chamber to the 12-seconds and 60-seconds Vertical Burn Test. The burn length is recorded in mm. Three samples of each epoxy-based composition are tested and the results averaged.

Exothermicity 100 g of the precursor composition are filled into a stainless steel round bottom cup having a diameter of 100 mm and a height of 35 mm. An electrical thermocouple is placed in the center of the precursor. The precursor is then cured by placing it into a forced air oven and running a curing cycle where the oven temperature is raised from 23° C. to 175° C. using a heating rate of 2° C./min. Then the temperature is held at 175° C. for 1 hour. The peak exotherm is calculated by subtracting the oven heat from the maximum heat recorded by the thermocouple in the precursor composition, i.e. the maximum temperature recorded by the thermocouple minus 175° C.

Dynamic Mechanical Thermal Analysis (DMTA)

For DMTA testing a DMTA V Rheometer by Rheometric Scientific Inc., Piscataway, N.J. 08854, USA can be used. For the preparation of test specimens the precursor is coated between 2 silicone release liners to a thickness of about 0.3 mm and cured in an air forced oven using a curing cycle from 23° C. to 175° C. at a heating rate of 2-5° C. minutes. Then the temperature is held at 175° C. for 1 hour to completely cure the epoxy-based composition. The cured epoxy-based composition are cooled down to 23° C. over a period of 45 minutes. Test specimens are cut out having a dimension of 5 mm×10 mm and are subjected to DMTA testing for the evaluation of the glass transition temperature (Tg). The following DMTA settings can be used:

Used Mode: Tensile mode (static force tracking dynamic force)
Orientation of the drive assembly: Horizontal
Temperature range of measurements: −50° C./+300° C.
Heating rate at: 2° C. per minute
Frequency measured at: 1 Hz
Strain at: 0.05%

Density

Samples of the epoxy-based composition were prepared by casting the corresponding precursors into moulds and curing in a forced air oven using a temperature program as described under the test method "Compressive Strength".

The cured samples were removed from the moulds and their exact dimensions recorded. Each sample was weighed and the density calculated and recorded in grams per $cm^3$.

EXAMPLES

Examples 1 and 2 and Comparative Example C1-C3

Epoxy-based curable compositions were prepared by combining in each case the compounds listed below in Table 1 in a 2.0 liter mechanical mogul type mixer commercially available by Linden GmbH, Germany. In Table 1, all concentrations are given as weight percent.

A temperature of less than 35° C. was maintained during the mixing process, using water-cooling. The epoxy resin was added first and mixed at 20 to 40 rpm with the other ingredients wherein the ingredients are added one after each other and are mixed for about 20 minutes until a homogeneous blend was achieved before the next ingredient was added. In a final step the homogeneous blend was degassed by applying a 100 mbar vacuum for 5 minutes. The precursor formulations were stored −18° C.

All precursor formulations were pastes having a smooth and uniform consistence.

TABLE 1

| ingredients of precursor compositions | | | | | |
|---|---|---|---|---|---|
| Component (wt %) | Ex 1 | C 1 | Ex 2 | C 2 | C 3 |
| EPIKOTE 232 epoxy resin consisting of a blend of a bisphenol A resin (produced from bisphenol A and epichlorohydrine) and a bisphenol F resin (produced from bisphenol F and epichlorohydrine), available from Momentive Performance Materials Inc. | 25 | 26.5 | 25 | 25 | 25 |
| ECA 100NC (methyl tetrahydrophthalic anhydride) | 24.35 | 24.35 | 24.35 | 24.35 | 24.35 |
| Curezol 2MA-OK (2,4-diamino-6-[2'-methyl imidazolyl-(1')]-ethyl-s-triazine isocyanuric acid adduct dihydrate, Mp = 260° C.) | 0.15 | 0.15 | 0.15 | 0.15 | 0.15 |
| ERISYS GE 35 Castor oil triglycidyl ether | 1.5 | | | | |
| ERYSIS GE 36 Propoxylated glycerine triglycidyl ether | | | 1.5 | | |
| EPODIL L Liquid aromatic hydrocarbon (pine oil) | | | | 1.5 | |
| HELOXY MODIFIER Diglycidylether of 1,6-hexanediol | | | | | 1.5 |
| Additives (identical combinations of fillers (glass microspheres) and fire retardants. | 49 | 49 | 49 | 49 | 49 |
| Total | 100 | 100 | 100 | 100 | 100 |

TABLE 2

| Properties of precursor compositions and cured compositions respectively | | | | | |
|---|---|---|---|---|---|
| Test | C1 | C2 | C3 | Ex1 | Ex2 |
| Compressive Strength at 23° C. (MPa) | 45 | 35 | 38 | 42 | 43 |
| Compressive Strength at 80° C. (MPa) | 25 | 6 | 11 | 24 | 25 |
| Visual effects on prepregs after milling | yes | yes | yes | no | no |

TABLE 2-continued

Properties of precursor compositions and cured compositions respectively

| Test | C1 | C2 | C3 | Ex1 | Ex2 |
|---|---|---|---|---|---|
| Density (g/cm$^3$) | 0.65 | | | | 0.65 |

The following list of particular embodiments is provided to further illustrate the present disclosure without intending to limit the disclosure to the specific embodiments listed.

List of Particular Embodiments

1. Use of a Curable Composition Comprising
   (i) at least one epoxy resin comprising at least one repeating aromatic moiety,
   (ii) an epoxy hardener,
   (iii) a low molecular weight polyepoxy compound having the general structure

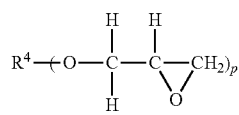

wherein $R^4$ is a p-valent moiety that is linear or branched, and preferably is aliphatic, and contains from 10 to 100 carbon atoms, p is an integer from 3 to 6, preferably p is 3 or 4, most preferably p is 3 as a filler of cells of a honeycomb structure.

2. The Use of Embodiment 1 Wherein the Epoxy Hardener System of the Curable Composition Comprises a Carboxylic Acid Anhydride Curing Agent.

3. The use of anyone of the preceding embodiments wherein the epoxy hardener system of the curable composition comprises a carboxylic acid anhydride curing agent and at least one amine curing agent.

4. The use of anyone of the preceding embodiments wherein the epoxy hardener system of the curable composition comprises a carboxylic acid anhydride as a major component and an amine as a minor component.

5. The use of anyone of the preceding embodiments wherein the curable composition has an initial extrusion rate of from about 50 g/min to about 300 g/min when being extruded at a temperature of 25° C. and a pressure of 5 bar for 60 seconds through a circular aperture having a diameter of 6.35 mm.

6. The use of anyone of the preceding embodiments wherein the curable composition has an initial extrusion rate of from about 50 g/min to about 300 g/min and an extrusion rate of from about 50 g/min to about 300 g/min 3 days and 5 days after preparation when being extruded at a temperature of 25° C. and a pressure of 5 bar for 60 seconds through a circular aperture having a diameter of 6.35 mm.

7. The use of any one of the preceding embodiments wherein the curable composition further comprises a filler capable of reducing the density of the curable composition.

8. The use of anyone of the preceding embodiments wherein the curable composition further comprises one or more fire retardants.

9. The use of any one of the preceding embodiments wherein the curable composition has an exothermicity of less than about 60° C.

10. The use of any one of the preceding embodiments wherein the curable composition has a compressive strength after curing of at least about 30 MPa at 23° C., of at least about 20 MPa at 80° C.

11. The use of any one of the preceding embodiments wherein the curable composition comprises an epoxy resin containing repeating units derived from monohydric, dihydric or trihydric phenols which may be non-substituted or alkyl substituted and further comprises glycidyl ether moieties.

12. The use of any of the preceding embodiments wherein the curable composition comprises an epoxy resin comprising repeating units derived from bisphenol A and epichlorohydrine, bisphenol F and epichlorohydrine or a combination thereof.

13. The use of any one of the preceding embodiments wherein the curable composition comprises an epoxy resin comprising units derived from epichlorohydrine a dihydric or trihydric phenol, and formaldehyde.

14. The use of any one of the preceding embodiments wherein the curable composition comprises a filler capable of reducing the weight of the composition comprising inorganic hollow particles.

15. The use of any one of the preceding embodiments wherein the curable composition contains from about 10 to about 70% by weight of the epoxy resin, from about 1 to about 55% by weight of the epoxide hardener system and from about 0.5 to about 5% by weight of the low molecular weight polyepoxy compound and, optionally, from about 10 to about 60% by weight of the filler capable of reducing the weight of the composition and, optionally, from about 5 to about 50% by weight of one or more fire retardants, wherein the percentages by weight are based on the total amount of the composition and the total amount of weight percentages gives 100%.

16. The use according to anyone of the preceding embodiments wherein $R^4$ of the low molecular weight epoxy compound of the curable composition is acyclic.

17. The use according to any one of the preceding claims wherein $R^4$ of the low molecular weight epoxy compound of the curable composition is a linear or branched hydrocarbon or a linear or branched heterohydrocarbon, and may be saturated or unsaturated.

18. The use according to anyone of the preceding claims wherein $R^4$ of the low molecular weight epoxy compound of the curable composition is a polyether.

19. The use according to anyone of the preceding embodiments wherein $R^4$ of the low molecular weight epoxy compound of the curable composition comprises a glycerol unit whose hydroxyl groups have been modified to carry glycidyl ether carrying substituents.

20. The use according to anyone of the preceding embodiments wherein the low molecular weight polyepoxy compound of the curable composition is selected from propoxylated glycerol triglycidyl ethers, ethoxylated glycerol triglycidyl ethers, ethoxylated and propoxylated glycerol triglycidyl ethers, triglycidyl ethers of glycerol esters of hydroxy carboxylic acids including castor oil triglycidyl ether.

21. Use of a cured composition obtainable by curing the curable composition as defined in to anyone of embodiments 1 to 20 as a filler for cells of a honeycomb structure.

22. The use according to embodiment 21 wherein the cured composition has a compressive strength of at least 30 MPa at 23° C., of at least 20 MPa at 80° C.

23. The use according to embodiment 11 or 12 having a density of between 0.6 and 0.8 g/cm$^3$.

24. The use according to any one of embodiments 1 to 23 wherein the honeycomb structure comprises a honeycomb frame comprising a metal or a fiber composite.

25. The use according to anyone of embodiments 1 to 24 wherein the honeycomb structure contains cells having a length, depth and width of from about 0.4 to 15 cm.

26. The use according to anyone of embodiments 1 to 25 wherein the honeycomb structure having a rectangular and/or hexagonal cells.

27. The use according to anyone of the preceding embodiments wherein the honeycomb structure is part of a sandwich composite comprising a layer, for example a sheet or a coating, covering at least a part of an external surface of the honeycomb structure.

28. The use according to anyone of the preceding embodiments wherein the honeycomb structure is part of a sandwich composite comprising a layer, for example a sheet or a coating, covering at least a part of an external surface of the honeycomb structure and wherein said layer comprises a composite containing fiber embedded in a resin, preferably a resin selected from phenolic resins.

29. The use according to any one of the preceding embodiments wherein honeycomb structure is a component of an interior wall or floor panel of an airplane or a building.

30. A honeycomb structure comprising cells filled with a composition comprising the cured composition of anyone of embodiments 21 to 23.

31. The honeycomb structure of embodiment 30 comprising a honeycomb core comprising a metal or a fiber composite.

32. The honeycomb structure of embodiments 30 or 31 containing cells having a length, depth and width of from about 0.4 to 15 cm.

33. The honeycomb structure of embodiments 30 to 32 wherein the honeycomb structure has rectangular and/or hexagonal cells.

34. The honeycomb structure of embodiments 30 to 33 being part of a sandwich composite comprising a layer, for example a sheet or a coating, covering at least a part of an external surface of the honeycomb structure.

35. The honeycomb structure of embodiments 30 to 34 being part of a sandwich composite comprising a layer, for example a sheet or a coating, covering at least a part of an external surface of the honeycomb structure and wherein said layer comprises a phenolic resin or a phenolic resin composite.

36. The honeycomb structure of embodiments 30 to 35 being a component of an interior wall or floor panel of an airplane or building.

37. A wall panel or floor panel containing a honeycomb structure of embodiments 30 to 35.

38. An aircraft selected from airplanes and helicopters comprising an interior wall or floor panel containing a honeycomb structure of anyone of embodiments 30 to 35.

39. Process for filling cells of a honeycomb structure comprising applying a curable composition as defined in any one of embodiments 1 to 20 to the cells of the honeycomb structure and curing the composition, optionally, applying at least one layer to the external surfaces of the filled honeycomb to provide an interface of that layer with the filler and to create a sandwich composite or a precursor thereof.

40. The process according to embodiment 39 wherein the honeycomb structure is as defined in embodiments 30 to 36.

The invention claimed is:
1. A curable composition comprising
(i) at least one epoxy resin comprising at least one repeating aromatic moiety,
(ii) an epoxy hardener,
(iii) a low molecular weight polyepoxy compound having the general structure

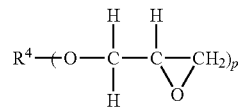

wherein $R^4$ is a p-valent moiety that is linear or branched, and contains from 10 to 100 carbon atoms, and p is an integer from 3 to 6; and
(iv) a filler capable of reducing the weight of the composition comprising inorganic hollow particles.

2. The composition according to claim 1 wherein the epoxy hardener system of the curable composition comprises a carboxylic acid anhydride curing agent.

3. The composition according to claim 1 wherein the curable composition has an initial extrusion rate of from about 50 g/min to about 300 g/min and an extrusion rate of from about 50 g/min to about 300 g/min 3 days and 5 days after preparation when being extruded at a temperature of 25° C. and a pressure of 5 bar for 60 seconds through a circular aperture having a diameter of 6.35 mm.

4. The composition of according to claim 1 wherein the curable composition has an exothermicity of less than about 60° C.

5. The composition according to claim 1 wherein the curable composition comprises an epoxy resin comprising repeating units derived from bisphenol A and epichlorohydrine, bisphenol F and epichlorohydrine or a combination thereof.

6. The composition according to claim 1 wherein the curable composition contains from about 10 to about 70% by weight of the epoxy resin, from about 1 to about 55% by weight of the epoxide hardener system and from about 0.5 to about 5% by weight of the low molecular weight polyepoxy compound and, optionally, from about 10 to about 60% by weight of the filler capable of reducing the weight of the composition and, optionally, from about 5 to about 50% by weight of one or more fire retardants, wherein the percentages by weight are based on the total amount of the composition and the total amount of weight percentages gives 100%.

7. The composition according to claim 1 wherein $R^4$ of the low molecular weight polyepoxy compound of the curable composition is a polyether.

8. The composition according to claim 1 wherein the low molecular weight polyepoxy compound of the curable composition is selected from propoxylated glycerol triglycidyl ethers, ethoxylated glycerol triglycidyl ethers, ethoxylated and propoxylated glycerol triglycidyl ethers, triglycidyl ethers of glycerol esters of hydroxy carboxylic acids including castor oil triglycidyl ether.

9. A honeycomb structure comprising cells filled with a cured composition obtained by curing a curable composition comprising
(i) at least one epoxy resin comprising at least one repeating aromatic moiety,
(ii) an epoxy hardener, and
(iii) a low molecular weight polyepoxy compound having the general structure

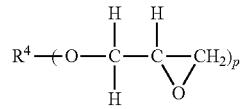

wherein $R^4$ is a p-valent moiety that is linear or branched, and contains from 10 to 100 carbon atoms, and p is an integer from 3 to 6.

10. A wall panel or floor panel containing a honeycomb structure of claim 9.

11. An aircraft selected from airplanes and helicopters comprising an interior wall or floor panel containing a honeycomb structure of claim 9.

12. Process for filling cells of a honeycomb structure of claim 9 comprising applying a curable composition as defined in claim 9 to the cells of the honeycomb structure and curing the composition.

* * * * *